Feb. 15, 1938.  C. W. HARRIS  2,108,260
NAVIGATIONAL INSTRUMENT
Filed June 14, 1935　　2 Sheets-Sheet 1

Inventor
Charles W. Harris
By Charles L. Reynolds
Attorney

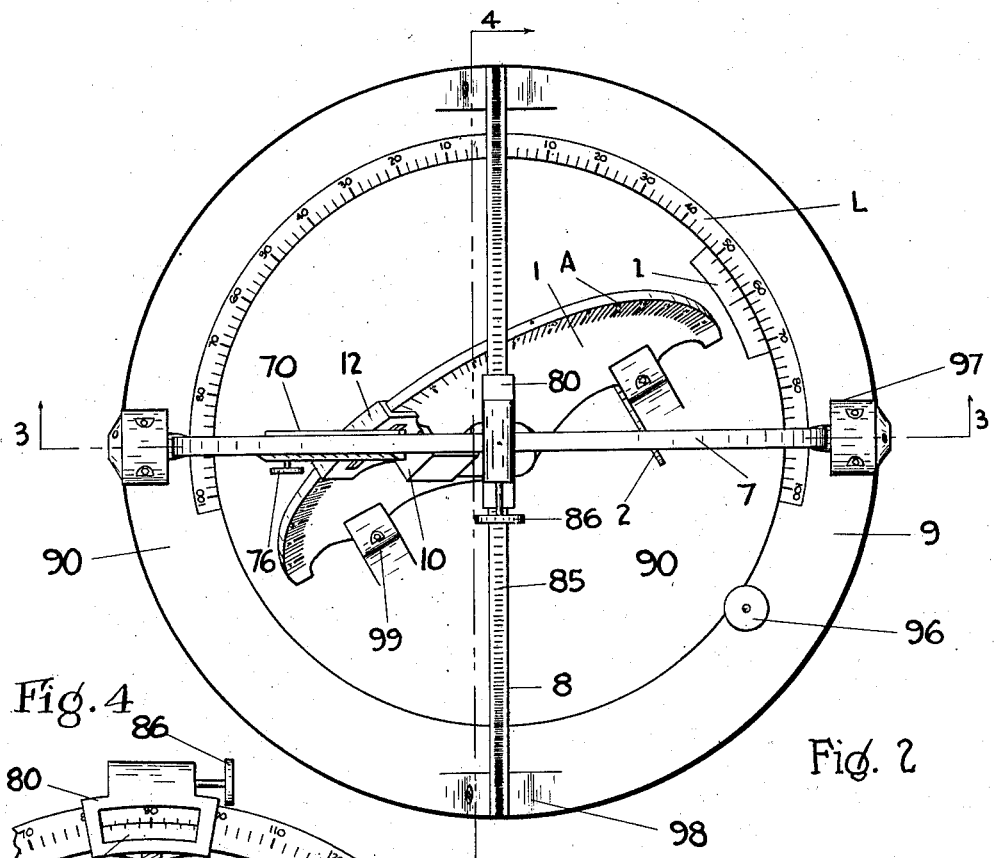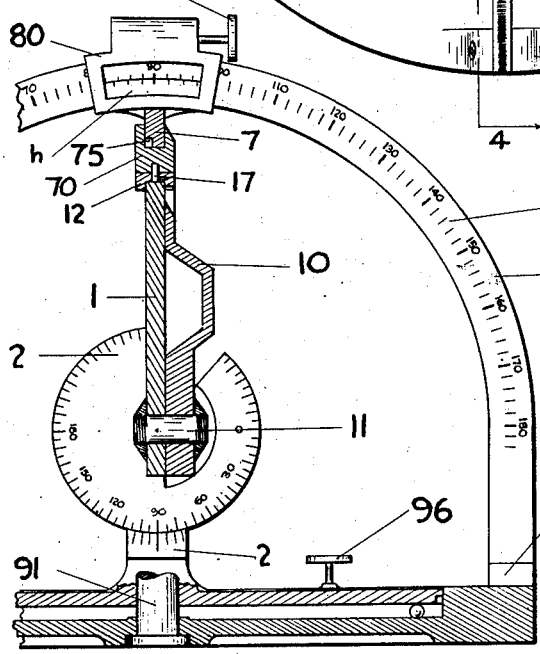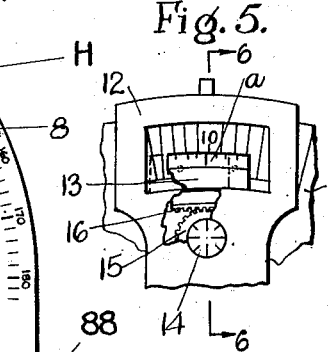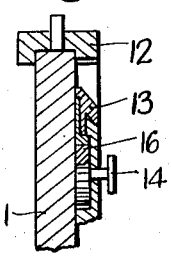
Charles V. Harris

Patented Feb. 15, 1938

2,108,260

UNITED STATES PATENT OFFICE 2,108,260

NAVIGATIONAL INSTRUMENT

Charles W. Harris, Seattle, Wash.

Application June 14, 1935, Serial No. 26,589

2 Claims. (Cl. 33—1)

My invention relates to an instrument for use in solving problems arising in navigation.

One of the most tedious and exacting parts of the routine of a navigator which must be gone through several times daily, and one which is liable to error, either from mathematics or from incorrect reading of tables, is the determination of a ship's position. Various methods have been employed for such determinations. To carry out some of them it was at one time considered necessary to have available a large number of tables reading in seconds, or, if the number of tables was to be made less (for example, down to tenths of minutes), interpolation must be resorted to, and still a large number of tables must be available. To somewhat simplify these operations, newer methods have been adopted which require the assumption that a vessel is at a location where it is known she cannot reasonably be, and then by a series of calculations (based on observation) to obtain her line of position, but since indirect computation and unnecessary assumption is required in carrying out this method, the probability of error is greatly increased.

In all such previous methods resort must be had to a variety of tables, thus introducing the possibility of error through the incorrect reading of the tables, as well as in the attending calculation. It is therefore a primary object of this invention to eliminate any reference to computational tables, and similarly to confine the calculation to the simple operation relating to time, to the end that by the most direct method the azimuth and computed altitude of the observed celestial body may be obtained, from which a line of position may be plotted so that with another related observation there can be obtained, in a minimum of time and with a minimum chance of error, the exact location or fix of the ship's position.

More specifically it is an object to provide a precision device or instrument of a convenient size, which can be made as accurate as the sextant and reading in the same familiar and uniformly graduated units of arc, which will serve as a calculator, taking into consideration the D. R. latitude, the hour-angle at the instant of observation, and the declination of the observed body at the instant of observation, thus to calculate automatically and give immediately to the navigator the azimuth of the observed body and the altitude thereof for comparison with the observed altitude obtained by the sextant observation. Thus the navigator requires only his sextant and his Nautical Almanac and chronometer, and need not refer to such tables, for example, as are contained in Dreisonstok or in Hydrographic Office Publication No. 211.

Since an instrument of this sort must be very accurate, and may be rendered inaccurate from loose bearings, wear of parts, slight inaccuracies of scale graduation or in the manufacture of parts, or like causes, arising during manufacture or during use, and such extreme accuracy would be required as to be impractical commercially to avoid certain of these inaccuracies, and even so those arising from use would be unavoidable, it is a further object to provide means whereby to adjust the instrument, according to a correction table, to compensate for such inaccuracies, thereby enabling the commercial production of the instrument at a reasonable cost.

Other objects, more especially such as relate to details or to construction, will become apparent as this specification progresses.

My invention comprises the novel instrument, and the novel parts and relative arrangement of the same, as shown in the accompanying drawings in a preferred form, which form will be described, and the principles of my invention made clear, in this specification, and the scope thereof accurately defined by the appended claims.

Figure 2 is a plan view of the instrument, certain parts having been altered in position from the position of Figure 1 for better illustration, and the altitude indicator being of a somewhat modified construction.

Figure 4 is a similar section on line 4—4 of Figure 2, with parts substantially in the position of Figure 3.

Figure 5 is a detail elevation, partly broken away, and Figure 6 is a section on line 6—6 of Figure 5, illustrating the means to adjust for localized instrumental errors.

Figures 1, 3:
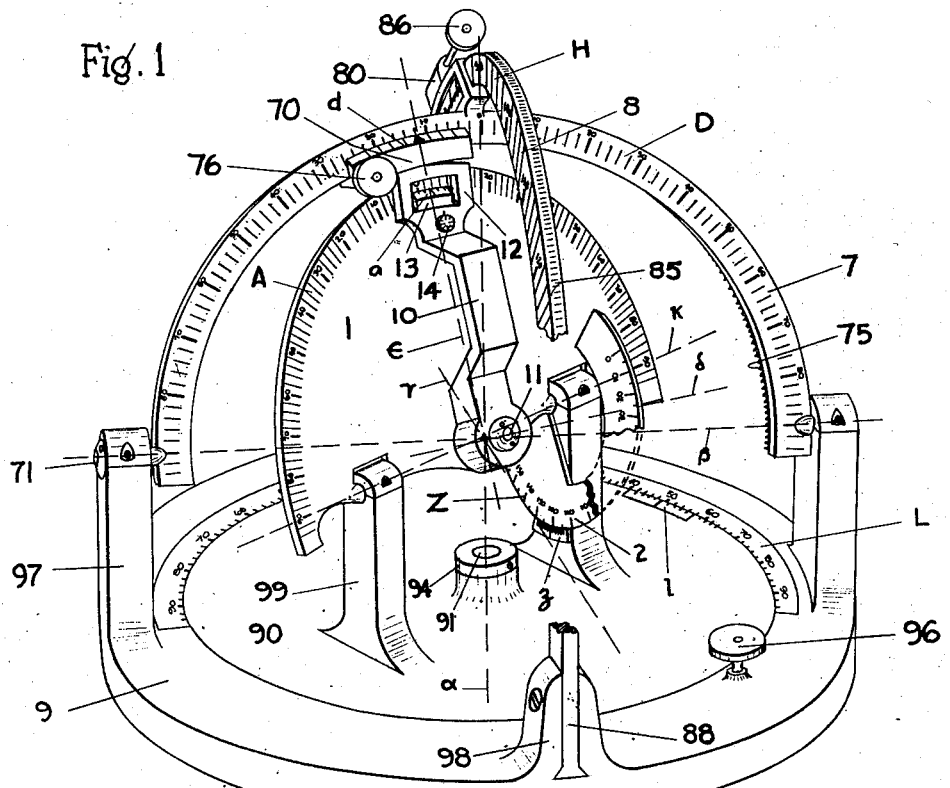
Figure 1 is a perspective view of the instrument set in position according to certain observations to obtain an azimuth and altitude reading, the altitude indicator being shown as provided with means to adjust for localized instrumental errors.
Figure 3 is a cross section on the line 3—3 of Figure 2, parts being again changed in position.

Essentially my device comprises five different indicators—a latitude indicator, an hour-angle indicator, a declination indicator, an altitude indicator, and an azimuth indicator. In the sense which I here use the term "indicator" it is to be understood as meaning a circular scale and a cooperating index, and it is largely immaterial whether the index rotate relatively to the scale, or the scale relatively to the index; hence while I shall now proceed to describe the instrument in detail, it must be borne in mind that changes such as those suggested and others may be made as the skill of the navigator or designer of such instruments would dictate.

The latitude indicator, in the present instrument, consists of a circular base 9 bearing the scale L, with which cooperates a table 90 bearing the index $l$, the table being rotatable about an axis $\alpha$ (see Figure 1). Any suitable pivot arrangement which will be sufficiently accurate may be employed. Thus a headed pin 91 projects upwardly from the base 9 and is received in a boss 92 formed at the center of the table 90. Balls 93 or similar antifriction means may be employed to permit the table to rotate readily. The table is held in place by the collar 94, and rotation may be given to it in any suitable manner, as for example by a pinion (not shown) engageable with the circular rack 95 and rotatable by means of the thumb screw 96. The scale L preferably extends 90° or more in each direction from a zero point, and the index $l$ (as well as other indices hereafter described) is preferably a vernier index.

Disposed equatorially with respect to the latitude scale L is an hour-angle indicator, consisting of the circular arc 8, the feet 88 of which are received immovably between ears 98 of the base 9, this arc 8, which lies in a plane normal to the polar axis of the latitude scale L, bearing an hour-angle scale H. An index $h$ moves along and cooperates with this circular scale. It may be formed upon a slide 80, and its movement may be controlled by means of a worm pinion (not shown) mounted in the slide 80, rotatable by means of the thumb screw 85 and engageable with teeth 85 upon the periphery of the arc 8.

The slide 80, carrying the hour-angle index $h$, is fixed to the central part of an arc 7 pivoted upon an axis $\beta$ which is parallel to the polar axis of the latitude scale L. The arc 7, however, is always in a plane normal to the arc 8 bearing the hour-angle scale H. It may be supported for tilting movement upon trunnions 71 supported in posts 97 fixed to and projecting above the base 9. By such means the hour-angle index is rotatable about the axis $\beta$, which is perpendicular to the axis $\alpha$ (see Figure 1). The arc 7 carries an angular declination scale D, and a slide 70 carrying an index $d$ cooperates with the scale D to indicate declination. The movement of the slide 70 may be controlled as the other indicators were controlled, for example, a thumb screw 76 being provided for the purpose, and the arc 7 bearing teeth 75 to accomplish its control.

It may be stated here that of the table 9, the slide 80 and the slide 70, all may be controlled in corresponding fashion, and each of them may be provided with clamp means so that they may be clamped at any given setting, but as such means are well known in the instrument art, and of themselves form no particular part of my invention, they have been omitted for clearer illustration.

It may now be pointed out that the index 70 is rotatable about an axis $\gamma$, which is perpendicular to the axis $\beta$, but which will only be perpendicular to the axis $\alpha$ in the special case when the hour-angle is 90°. However, the three axes, $\alpha$, $\beta$, and $\gamma$, all intersect at a common point.

Upon posts 99, rising from the table 90, is tiltably mounted a semi-circular plate or arc 1. This bears a scale A, which is the altitude scale, and with it cooperates an index $a$ carried by an arm 10 pivoted to the plate 1 to swing about an axis $\delta$ perpendicular to the plane of plate P. A pivot post 11 passes through the plate 1 and arm 10, and has sufficient bearing that the arm with its index $a$ moves accurately over the scale A.

At its peripheral end the arm 10 may be provided with a windowed head 12, which carries the index $a$, which head is in turn pivotally connected to the slide 70 by a pivot pin 17, so that the entire plate 1 in effect rotates about an axis $\epsilon$ which coincides with the axis of the pivot pin 17, and which in turn passes through the point common to the axes $\alpha$, $\beta$, $\gamma$, and also $\delta$. The tilting of the plate 1 on the post 99 is about an axis $\kappa$, which is parallel to the plane of the latitude indicator, and this axis $\kappa$ again intersects all the other axes at the common point, which may be likened to a geocentric point.

Arranged in a plane normal to the axis $\kappa$, and therefore normal to the plate 1 which is in a radial plane with respect to the axis $\kappa$, is a circular plate 2. This plate 2 is secured to the plate 1 to swing with the latter about the axis $\kappa$, and the plate 2 bears an azimuth scale Z. Cooperating with this scale Z is an index $z$ which may, for example, be fixed upon one of the posts 99.

Instead of scribing the index $a$ directly on the head 12, it is preferable that it be scribed on a slide 13, adjustable transversely of the head 12 by means such as the pinion 15, carried by the arm 10, meshing with the rack 16 on slide 13, and rotatable by the adjusting screw 14. An instrument such as this, no matter how carefully made, is subject to localized instrumental errors, or may become erroneous through distortion or abuse of parts. Such errors may be cumulative at the altitude index, hence compensatory adjustment at this point is particularly desirable; however, similar adjustment may be made at each index, if desired.

It is possible, by setting the several indices at definite points, and by reference to tables and calculations as now commonly employed, to determine if it reads correctly. For example, at a given latitude, a given hour-angle, and a given declination, the altitude reading should be always the same, and should correspond exactly to the "computed altitude" as determined from tables and calculations. If the instrumental reading does not exactly correspond (though it can be made accurate within the usually required range of accuracy for ordinary navigation), the index $a$ can be adjusted to correspond exactly, and its variation for this latitude, hour-angle, and declination noted. By similarly checking the instrument for every degree, or for every five or ten degrees, a table of correct readings for every range of settings can be obtained, and adjustment may be made for such localized instrumental errors when extremely accurate navigation requires it.

For the purpose of illustrating the use of this instrument one may assume a ship to be in the general position of the northern extremity of Vancouver Island in the North Pacific, say 49°26.4′ N. Lat. and 136°37.2′ W. Long., as determined by the customary D. R. method. By observation in the early morning the navigator finds the sextant altitude of the sun, and records this altitude together with the exact time by chronometer. By means of the Nautical Almanac, using the recorded time and the D. R. longitude, the exact hour-angle of the sun is found. This may include fractional minutes of arc, as for example 68°18.7'. The declination of the sun at the instant of observation is also available in the Nautical Almanac, and on this particular instant and date in the autumn was 10°59.1' S. All of this information is obtained from the sextant and chronometer reading, and from the Nautical Almanac.

It is now desired to make correction to the D. R. position by applying the usual "computed altitude" method. The present instrument now comes into use, and is set accurately in a position roughly shown in Figure 1, and gives the desired altitude and azimuth upon setting the latitude of the D. R. position and the hour-angle and declination and azimuth are given without reference to logarithms or other computing tables, and without the aid of any assumed position other than the D. R. position first recorded.

Procedure is as follows: First, on the latitude scale L, set off the D. R. latitude, in this case 49°26.4' N. Second, on scale H, the hour-angle scale, set off the hour-angle, 68°18.7'. Third, on scale D, the declination circle, set off the declination, 10°59.1' S. The desired "computed altitude" of the sun is then read from the scale A, the altitude circle, and the azimuth of the sun is read from the scale Z, the azimuth circle.

Having thus obtained the required information, the previously shown D. R. position is corrected by a number of miles corresponding to the difference in minutes between the observed sextant altitude and the instrumentally determined "computed altitude". The direction in which the correction is to be made is shown by the instrumentally determined azimuth, the corrected position being toward the sun, if the sextant altitude is larger than the "computed altitude", and conversely. The line of position may now be drawn through the corrected point and perpendicular to the azimuth. A fix may thus be determined by the intersection of two such lines of position made simultaneously by observation on two celestial objects, or by two solar observations taken with the sun at different azimuths, and with proper consideration of intervening distance run by the ship. In other words, the "computed altitude" and the azimuth may be obtained by direct reading from the instrument without reference to tables, and may be used exactly as is used the "computed altitude" obtained from tables, and the azimuth, but the navigator is not required to go through a lengthy and involved computation, with the possibility of mathematical error, and with the possibility of incorrectly reading tables.

It will be observed that when any three of the quantities are known, and the corresponding scales are set, the other two quantities become known. Hence while for most purposes the instrument will be operated in the manner described, it may be used in other ways, that is to say, to obtain a latitude reading, knowing the hour angle, declination and altitude or azimuth.

In aerial navigation the methods heretofore used, requiring extensive calculation and reference to tables, are unsatisfactory because of the speed of the aircraft, placing it many miles from a calculated Sumner line before that line is determined, and because of the limitations of space and weight for carrying tables, and further because it is usually impractical for the pilot to do the navigating, necessitating an extra man, with his added weight, purely for navigating. This instrument eliminates the necessity for carrying or referring to tables, and makes it possible for the pilot, with but little distraction from his other duties, to ascertain his position quickly and with a high degree of accuracy.

What I claim as my invention is:

1. A navigational instrument comprising a fixed hour-angle scale, a pivoted declination scale disposed at all times in a plane normal to the plane of said hour-angle scale and swingable relatively thereto, an hour-angle index fixed upon said declination scale and swingable therewith over said fixed hour-angle scale, a declination index swingable along the declination scale, a pivoted altitude scale, an altitude index swingable along said altitude scale and pivotally connected to said declination index to move conjointly therewith but swingable relatively thereto, a latitude indicator disposed at all times in a plane normal to the plane of said hour-angle indicator, and including an index rotatable about an axis in the plane of the hour-angle scale and normal to the pivot axis of the altitude scale, a pivoted azimuth indicator disposed at all times in a plane normal to the plane of said altitude indicator, the axes of rotation of said hour-angle index, declination index, altitude index, azimuth indicator, and latitude index being so interrelated as to intersect in a common point, and means interconnecting said latitude and azimuth indicators with said hour-angle, declination and altitude scales and indexes to effect movement of any two of such indicators or scales and indexes, to designate resultant characteristics, in response to movement of the other three indicators or scales and indexes into positions corresponding respectively to known or given characteristics.

2. A navigational instrument comprising a base member, a pivoted member disposed parallel to said base member, one of said members bearing a latitude scale and the other a latitude index to constitute a rotatable latitude indicator, an arcuate hour-angle scale fixed to said base member in a position extending thereabove in a plane normal to said base member, a declination scale pivotally supported from said base member and disposed at all times beneath and in a plane normal to said hour-angle scale, an hour-angle index fixed upon said declination scale in a position extending upwardly therefrom to move over said hour-angle scale as the index swings with the declination scale, an altitude scale pivotally supported from said pivoted member and disposed below said declination scale, an altitude index arm pivoted on said altitude scale, a declination index swingable along said declination scale and pivotally secured to said altitude index arm to move conjointly therewith but swingable with respect thereto, and an azimuth indicator swingable with and secured to said altitude scale in a plane always normal thereto, the axes of rotation of said latitude indicator, hour-angle index, altitude index arm, declination index and azimuth indicator being so interrelated as to intersect in a common point, whereby movement of any two such indicators or scales and indexes will designate resultant characteristics in response to movement of the other three indicators or scales and indexes into positions corresponding respectively to known or given characteristics.

CHARLES W. HARRIS.